Aug. 30, 1966 W. C. DERSCH 3,270,216
VOICE OPERATED SAFETY CONTROL UNIT
Filed March 11, 1963 2 Sheets-Sheet 1

INVENTOR.
WILLIAM C. DERSCH
BY Flehr and Swain
ATTORNEYS

United States Patent Office 3,270,216
Patented August 30, 1966

3,270,216
VOICE OPERATED SAFETY CONTROL UNIT
William C. Dersch, Los Gatos, Calif., assignor to Voice Systems, Inc., Campbell, Calif., a corporation of California
Filed Mar. 11, 1963, Ser. No. 264,227
8 Claims. (Cl. 307—117)

This invention relates to voice operated control units for inactivating electrically energized equipment, and is particularly useful as a safety device for association with potentially dangerous mechanisms such as drill presses, lathes, milling machines and the like. More particularly the invention relates to such a voice operated control unit whereby after inactivating the controlled equipment, the latter can be reactivated merely by opening and closing its own main power switch.

In the operation of the above equipment or other apparatus, it may from time to time be necessary to immediately inactivate the equipment to prevent injury either to the operator or to the work in process. Emergency switches for immediately shutting down the operation of such equipment, i.e., inactivating the equipment, have been employed for many years. Many of these devices utilize emergency push buttons or foot pedals or like mechanical apparatus. Accordingly, there is not uncommonly some momentary delay in using devices of this kind inasmuch as the operator customarily is not in the habit of having to employ the safety device. It is considered that where the safety device is activated as nearly as possible by the reflex action of the operator himself, the danger to the operator or his workpiece will be substantially reduced.

It is a general object of the invention to provide an improved control for quickly inactivating electrically operated equipment.

It is another object of the invention to provide a voice operated control unit adapted to be interposed as a self-contained unit between a power outlet and equipment being controlled. In this manner no modification will need to be made to the controlled equipment in order to employ the control unit.

In order to minimize the time required to effect inactivation of the controlled equipment it is another object of the invention to provide a control unit which responds to indiscriminately voiced sounds of an operator nearby. In this manner the equipment can be activated by virtually any expletive as well as by recognizable words.

It is yet another object of the invention to provide apparatus of the above kind wherein enlargement of the monitored area by an increase in ambient noise level is controlled.

These and other objects of the invention will become more clearly apparent from the following detailed description of a preferred embodiment of the invention when taken in conjunction with the accompanying drawings in which:

FIGURE 1 schematically shows a system according to the invention.

FIGURE 2 schematically represents the system according to FIGURE 1 with a portion thereof shown in schematic electrical diagram detail.

In general, as will be explained in greater detail below, a voice operated control unit for inactivating electrically energized equipment is provided herein for controlling the equipment through the master control switch of the equipment itself. A unit is formed as a self-contained device adapted to be interposed between a power outlet and the equipment to be controlled. The unit comprises generally circuit means adapted to effectively form a portion or virtual continuation of the load circuit of the controlled equipment. This circuit means includes a normally inactive branch which incorporates a high impedance element. Means are provided for detecting the occurrence of voiced sound which thereby generates an electrical signal. This signal in turn serves to series-couple the high impedance element into the electrical load of the equipment being controlled, normally a motor or like device. The impedance of the series-coupled element is sufficiently great to reduce the voltage drop across the load to a level which is insufficient to keep the motor running, i.e., to reduce the potential across the load to a level insufficient to activate the equipment. Accordingly, the equipment is brought to a halt substantially instantaneously save for any momentum it may have. Means are further provided which operatively respond to the opening of the master control switch of the controlled equipment whereby by opening the On-Off switch of the equipment the high impedance element is decoupled from the load circuit of the motor. Subsequent reclosing of the switch reactivates the equipment.

Figure 1:
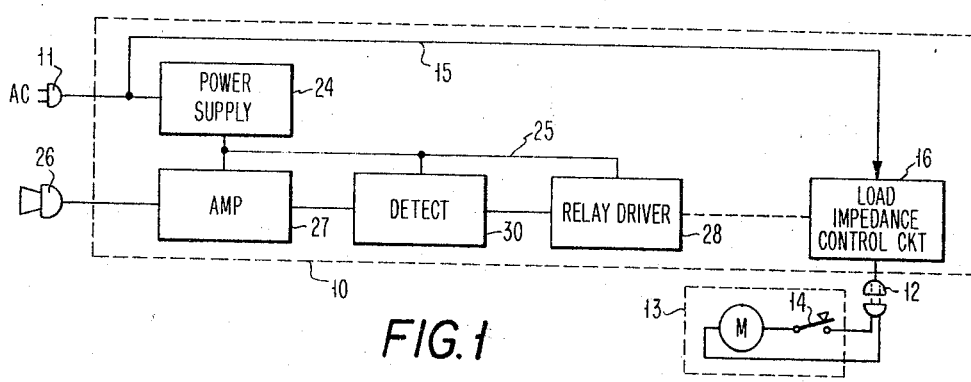

A self-contained control unit 10 is generally shown in FIGURE 1. Unit 10 includes a connection 11 adapted to be plugged into a conventional A.C. power outlet receptacle and further includes a connection 12 adapted to receive the power plug of equipment 13 to be controlled. It will be evident that equipment 13 can be virtually any equipment which is electrically operated through master control switch 14.

Figure 2:
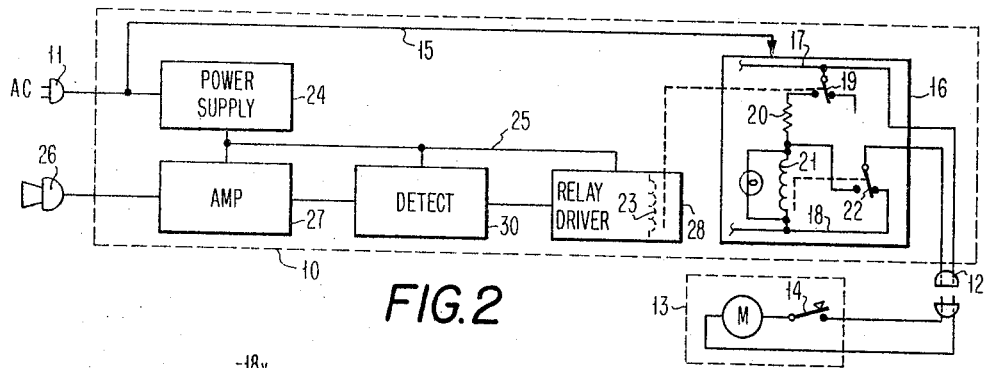

Circuit means are adapted to form a portion of the load circuit of equipment 13. Thus, line 15 leads from connection 11 to the load impedance control circuit 16 which is connected via plug 12 to the On-Off switch 14. Circuit 16 as shown in FIGURE 2 includes supply and return power lines 17, 18 respectively leading to connection 12. With switch 14 closed, lines 17, 18 permit normal operation of the motor of apparatus 13 via switch 14.

Circuit 16 further includes a normally inactive branch incorporating a high impedance element. Thus, connected in shunt with motor 13, between lines 17, 18 there is provided a branch defined by a normally open relay contact member or armature 19, a current limiting resistor 20, and a high impedance element in the form of a relay coil 21. Line 18 normally is connected to plug 12 by way of a switch such as relay armature 22, which is operated by coil 21. Coil 21, when energized via the normally inactive branch, serves to transfer armature 22 to connect line 18 to plug 12 via coil 21, thereby interposing the high impedance of coil 21 directly into the load circuit of motor 13. Thus, coil 21 also provides a holding circuit through the motor. An increase in impedance in the load circuit is accordingly established any time armature 19 is transferred to energize the normally inactive shunt branch of that portion of the load circuit carried in unit 10.

Armature 19 is operated by a relay coil 23 arranged to generate a signal in response to detection of the occurrence of voice sound.

"Voiced" sounds are defined in this art as those sounds which originate with air passing through the vocal chamber and which are modulated by physical changes in the various resonant chambers in the throat and mouth of the speaker. These sounds are distinguished from "unvoiced" sounds, which are formed primarily by air passing through constrictive chambers in the throat, mouth or at the teeth or lips. Voiced sounds are like complex multifrequency waves, but are not truly periodic and have damped oscillatory characteristics. The voiced sounds do, however, have for fundamental as well as harmonic frequency components, relatively brief but discernible intervals, and these components can usually be identified. The unvoiced sounds do not contain such fundamental frequencies, which are usually of the order of a few hundred to a few thousand cycles per second, but are noiselike in character and consist of essentially random amplitude vibrations with time.

The system in unit 10 as shown in FIGURE 1 preferably includes a relatively recent but extremely powerful technique which detects the occurrence of certain characteristics and particularly "voiced" sounds. "Voiced" sound detection means is preferred for use in the system herein and is referred to generally in FIGURE 1 by the reference numeral 30.

Figure 3:
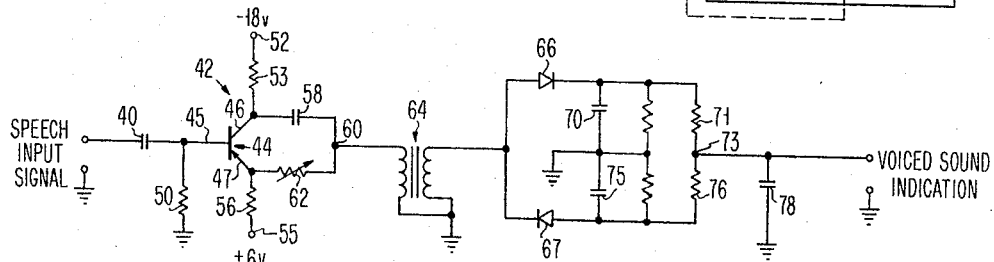
FIGURE 3 is a schematic electrical diagram of a circuit for detecting the occurrence of voiced sounds for use in the system of FIGURE 1.

Unit 10 further includes a power supply 24 connected to supply in a preferred example a 20-volt D.C. output. Such power supplies are, of course, well known in the art and can be of conventional design. The output of power supply 24 therefore appears on a common line 25 of D.C. potential. A microphone 26, preferably disposed near the work station of the operator of equipment 13, feeds an amplifier 27. Amplifier 27 in turn is connected to means for detecting the occurrence of voiced sounds as distinguished from other sound such as background noise and the like. Having detected the occurrence of voiced sound, circuit 30 serves to generate an electrical signal which is fed to a relay driver 28. Circuit 30 sensitively distinguishes voiced from both unvoiced sounds and ambient noise by detecting the occurrence of an asymmetry characteristic in electrical signal representations of human speech. The asymmetry characteristic is present only in voiced sounds, but is present in each case therein, and results in an amplitude difference between positive-going peaks and negative-going peaks in the complex multifrequency voiced sound wave. The complex wave is split into positive-going and negative-going cyclic components and a difference is taken between them which represents and identifies the asymmetry characteristic. In a specific example as shown in FIGURE 3, electrical signal representations of human speech are applied to a pair of parallel-coupled oppositely-poled diodes. One of the diodes passes the positive-going signal components in the complex multifrequency wave and the other diode passes the negative-going signal components. Each of these component waves is then applied to a peak charging circuit, which has a time constant which corresponds to a typical syllabic speech interval. The signal levels maintained by the two peak charging circuits are subtractively recombined, so that the difference between the peak signals appears at a circuit junction, as a measure of the asymmetry characteristic. Signals in excess of a selected absolute amplitude and/or polarity reliably identify the presence of voiced sounds.

A suitable voiced sound detecting circuit is shown in FIGURE 3. Electrical input signals representative of human speech are provided from a source (such as microphone 26 and amplifier 27 as shown in FIGURE 2) through a D.C. blocking capacitor 40 to a phase shifter 42. Here the phase shifter 42 includes a transistor 44, shown as of PNP conductivity type, by way of example, which has its base 45 coupled to ground through a resistor 50, its collector 46 coupled to a —18 volt supply 52 by resistor 53 and its emitter 47 couples to a +6 volt supply 55 through another resistor 56.

A selected phase delay may be introduced into the mono-frequency components of the amplified signals from the transistor 44 by a passive circuit coupling its collector 46 and emitter 47. The passive circuit includes a capacitor 58 which couples collector 46 to a circuit junction point 60, and a parallel adjustable resistor 62 which couples emitter 47 to the same circuit junction point 60. This phase shifter 42 passes all frequencies unattenuated, but the amount of phase shift introduced for any monofrequency component is dependent both upon the setting of the adjustable resistor 62 and the frequency itself. Accordingly, for different phase shifts of the various frequencies in a complex wave, the characteristic asymmetry pattern arising during a syllabic speech interval may be varied by certain adjustments, to favor positive-going cyclic components alone, negative-going cyclic components alone, or different sequences of these components, for given voiced sounds. Accordingly, circuit 30 can be adjusted to certain more specific commands if desired. However, as pointed out above it is ordinarily desirable in most instances to arrange unit 10 to respond to virtually any expletive or indiscriminately voiced sound.

Signals derived at the circuit junction 60 from the passive network are applied to a transformer 64 to a pair of parallel, oppositely poled semi-conductor diodes 66, 67 which perform a wave splitting function. The first of the diodes, 66, is poled to pass the positive-going cyclic components, while the second diode 67 is poled to pass negative-going cyclic components. With the reference axis of the waves being substantially at ground potential, this circuit provides accurate but separate representations of the positive and negative cyclic components of the complex multifrequency wave. A peak charging circuit coupled to the first diode 66 consists of a shunt capacitor 70 coupled to ground and a series resistor 71 coupled to a second circuit junction point 73. The peak charging circuit coupled to the second diode 67 also consists of a shunt capacitor 75 coupled to ground and a series resistor 76, the series resistor being coupled between the anode of the second diode 67 and the second circuit junction point 73. The diodes 66, 67 have matched characteristics as do the two peak charging circuits, so that like amplitude variations result at the second circuit junction point 73, for like absolute amplitude variations derived from the phase shifter 42.

The discharge time constants of the peak charging circuits are alike, and selected to be approximately 200 ms., corresponding to a typical syllabic speech interval. Signal variations occurring at the second circuit junction point 73 appear as relatively slow varying output signals at the output terminals of the circuit after smoothing capacitor 78 evens out the signal fluctuations.

With this arrangement, the phase delay may be set anywhere in a range of values, so as to selectively alter the asymmetry characteristic of given voiced speech waves. Assuming, however, that no phase delay circuit is employed and that a conventional microphone of the type which internally adjusts the phase relationships is employed whereby typical voiced speech waves appear at the input terminal, the positive-going cyclic component will be passed by the first diode 66 and the negative-going component will be passed by the second diode 67. The peak charging circuit elements 70, 71 which store the positive components, provide a signal which tends to shift the level of the second circuit junction point 73 an amount in the positive direction which corresponds to the highest amplitude of the positive-going cyclic components occurring during a syllabic speech interval. Similarly, the other peak charging circuit elements 75, 76 provide a signal which tends to shift the level of the potential at the second circuit junction point 73 in an opposite direction (negative) by an amount determined by the absolute amplitude of the negative-going component. The two signal levels are therefore subtracted at second circuit junction point 73, and the signal appearing at the output terminals is a relatively slowly varying component which represents the asymmetry characteristics for no phase delay.

Without phase delay, this asymmetry characteristic will usually consist of either a rounded positive pulse or a rounded negative pulse (depending on microphone polarity connection) having a duration substantially that of the syllabic speech interval. This voiced sound indicating signal is sensed and amplified in a relay driving circuit 28 wherein a relay, represented by coil 23, is energized responsive to the voiced sound indicating signal. As noted previously by energizing relay 23 a normally inactive shunt branch of circuit 16 is energized whereby the high impedance of coil 21 is disposed in series with the load of the controlled equipment 13.

Figure 4:
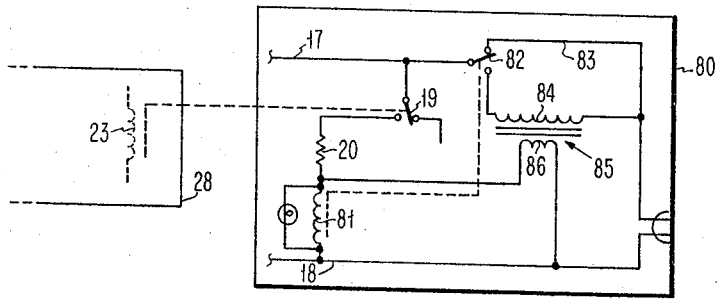
FIGURE 4 shows another embodiment of the detailed portion in FIGURE 2.

In certain instances the contact points of relay armature 19 may need to be protected. Another circuit 80 is shown at FIGURE 4 which serves to protect these contact points by insuring that armature 19 always looks at a constant load. Thus line 17 connects to plug 12 through a relay armature 82 conditioned to be normally connected to a direct coupled branch 83. Armature 82 can be transferred to series-couple a high impedance element to the load by energizing a holding coil 81 whenever armature 19 is closed. The primary winding 84 of the transformer 85 is disposed in series with the load (e.g., motor) of equipment 13 whenever coil 81 is energized. A secondary winding 86 of transformer 85 applies a sufficient potential across coil 81 to hold armature 82.

Figure 5:
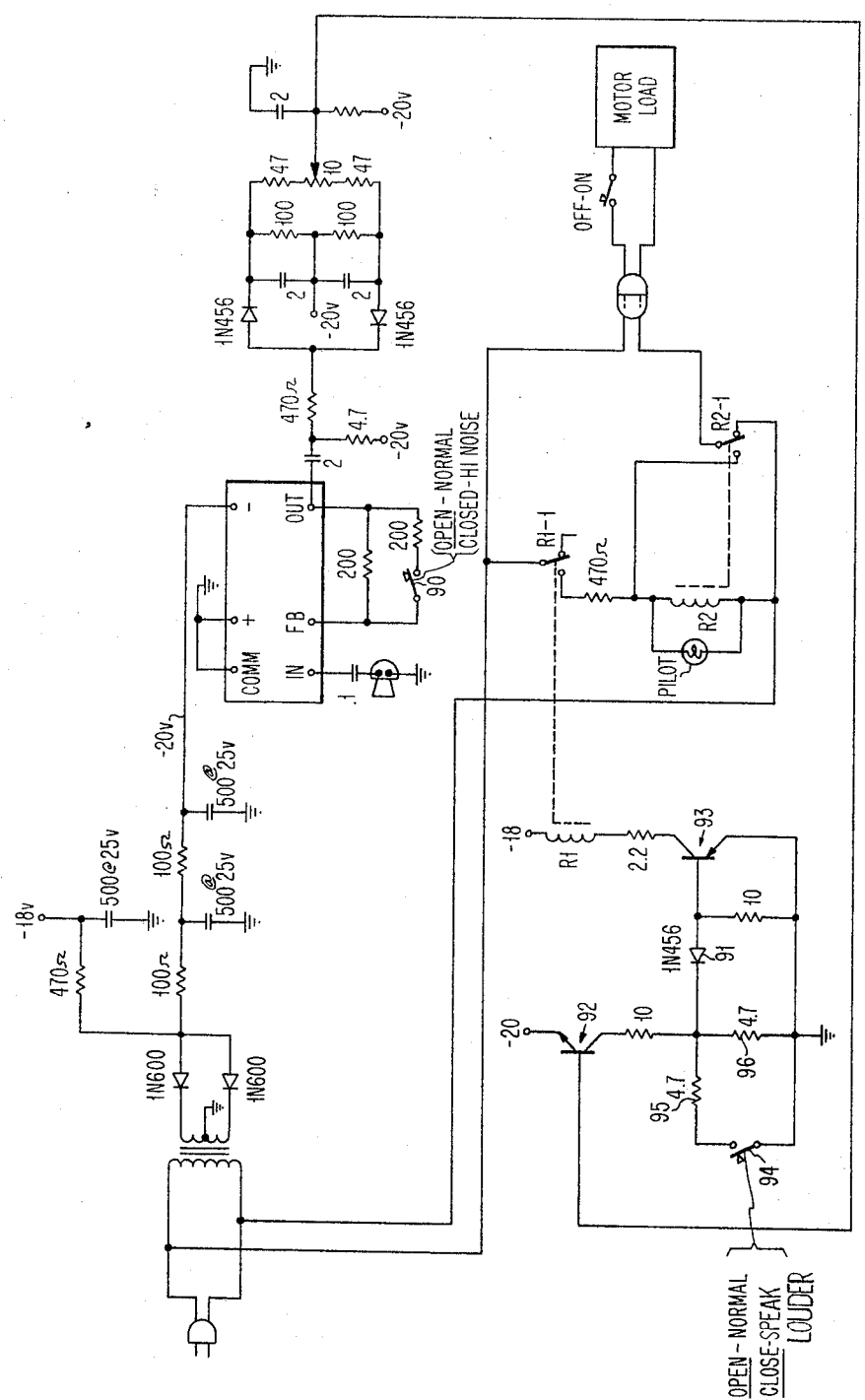
FIGURE 5 is a schematic diagram of a preferred embodiment of a system according to the invention.

While the above system has been described in sufficient detail to enable one skilled in the art to practice the invention, a specific example of a complete circuit together with values, voltages, and other pertinent identifying information is disclosed in FIGURE 5. Unless noted by the symbol omega ($\Omega$) all resistance values are in kilo-ohms. When indicated by the omega symbol the resistance values are measured in ohms. The capacitors are all measured in microfarads.

It has been observed that as ambient noise increases, persons unconsciously talk louder. Since the voiced sound detector-means can clearly "hear" voiced sounds even when the ambient noise drowns them out to the ear of the listener, the work station area being monitored by the microphone will enlarge gradually with ambient noise level to a point where, for example, conversation at one work station is sensed at another.

Accordingly, means are provided in the circuit of FIGURE 5 which serve to accommodate wide variations in environmental noise, by extending the dynamic range of the amplifier feeding the microphonic input to the voiced sound detection circuitry. At the same time means are provided serving to require a consciously increased loudness in voiced sound utterances above the environmental noise level in order to "trigger" a response.

In the system of FIGURE 5 there has been provided an ambient noise level control switch 90 which when closed serves to reduce the gain of the amplifier, so that excessively high ambient noise levels will not cause the output voltage excursion to exceed the linear capability of the amplifier. Reducing the amplifier gain would reduce the sensitivity of the over-all circuit function but for the fact that the operator unconsciously speaks correspondingly louder in the presence of increased ambient noise. The two-position switch shown can, of course, be replaced by a variable impedance control if desired.

The amplifier shown in FIGURE 5 can be of conventional design and provides a gain on the order of one hundred. The output impedance of the amplifier is significantly less than 470 ohms and switch 90 is disposed in the feedback network. One suitable amplifier is model 659 as manufactured by Allison Labs, La Habra, California.

It should further be noted that in the system of FIGURE 5 a silicon diode 91 is disposed between transistors 92 and 93. The forward drop of diode 91 is approximately .4 volt and serves to clip the base line noise from the signal.

Means in the system of FIGURE 5 serving to require a consciously increased loudness in voiced utterance to "trigger" a response includes the two-position manual switch 94 (which can also be a variable resistance device), and the additional resistor 95 disposed in parallel with the diode bias resistor 96.

I claim:

1. A voice operated control unit for inactivating electrically energized equipment incorporating a master control switch, said unit being formed as a self-contained device adapted to be interposed between a power outlet and the controlled equipment, said unit comprising circuit means adapted to form a portion of the load circuit of said equipment, said circuit means having a normally inactive branch including an impedance element, means for detecting the occurrence of voiced sound and for distinguishing same from unvoiced sound, the last named means serving to generate an electrical signal in response thereto, means responsive to said signal serving to couple said impedance element in series with the electrical load of said equipment, the impedance of said element being sufficiently large to reduce the potential across the load to a level insufficient to activate the equipment, and means operatively responsive to opening of said master control switch to de-couple said impedance element from the load circuit of the equipment and simultaneously therewith to restore and maintain said branch in its said normally inactive condition until activated by another of said signals derived from voiced sound, whereby reclosing the switch serves to reactivate the equipment.

2. A voice operated control unit for inactivating electrically energized equipment incorporating a master control switch, said unit being formed as a self-contained device adapted to be interposed between a power outlet and the controlled equipment, said unit comprising circuit means adapted to form a portion of the load circuit of said equipment, said circuit means having a normally de-energized branch including an impedance element disposed to be connected in shunt with said load, means for detecting voiced sound in the presence of environmental noise, means responsive to said detection of voiced sound serving to connect said branch to energize said element, means responsive to energizing said impedance element, to connect same in series with said load to reduce the potential across said load to a level insufficient to activate said equipment.

3. A voice operated control unit for inactivating electrically energized equipment incorporating a master control switch, said unit being formed as a self-contained device adapted to be interposed between a power outlet and the controlled equipment, said unit comprising circuit means adapted to form a portion of the load circuit of said equipment, said circuit means having a normally de-energized branch including an impedance element disposed to be connected in shunt with said load, means for detecting voiced sound in the presence of environmental noise, means responsive to said detection of voiced sound serving to connect said branch to energize said element, means responsive to energizing said impedance element, to connect another impedance element in series with said load to reduce the potential across said load to a level insufficient to activate said equipment.

4. A voice operated unit as defined in claim 3 wherein the last named impedance element is the primary winding of a transformer.

5. A voice operated control unit for inactivating electrically energized equipment incorporating a master control switch, said unit being adapted to be interposed between a power outlet and the controlled equipment, said unit comprising circuit means adapted to form a portion of the load circuit of said equipment, said circuit means havng a normally de-energized branch including an impedance element disposed to be connected in shunt with said load, detection means responsive to utterance of voiced sound in the presence of environmental noise and serving to connect said branch and energize said impedance element, said detection means including means for amplifying an acoustic input and serving to selectively extend the dynamic range of the amplifying means to accommodate relatively wide variations in environmental noise, said detection means further including manually settable means serving to selectively require a consciously increased loudness in voiced sound utterance relative to the environmental noise level in order to energize said impedance element, means responsive to energizing said impedance element to series-couple a sufficiently high impedance with said load to inactivate said equipment, the last named means being further responsive to opening of said master switch to de-energize said impedance element and decouple said high impedance from said series-coupled relation.

6. In combination with electrically energized equipment incorporating a master control switch, a voice operated control unit for inactivating said equipment, said unit being interposed between a power outlet and said equipment, said unit including circuit means adapted to form a portion of the load circuit of said equipment, said circuit means having a normally de-energized branch including an impedance element disposed to be connected in shunt with said load, detection means responsive to utterance of voiced sound in the presence of environmental noise and serving to connect said branch and energize said impedance element, means responsive to energizing said impedance element to series-couple a sufficiently high impedance with said load to inactivate said equipment and form a holding circuit via said energized impedance element, the last named means being further responsive to opening said master switch to de-energize said impedance element and open said holding circuit to decouple said high impedance from said series-coupled relation so as to restore said branch to its normally inactive condition.

7. A voice operated safety control unit for inactivating electrically energized equipment wherein the equipment includes a master control switch arranged to couple and decouple the load of the equipment to an electrical power supply to apply a potential across the load sufficient to activate same, said unit comprising means for detecting the occurrence of voiced sound and for distinguishing same from unvoiced sound, the last named means and serving to generate an electrical signal in response thereto, means responsive to said signal serving to reduce and hold said potential across the electrical load of said equipment at a level insufficient to activate the equipment, and means adapted to be connected to the load to respond solely to the manipulative sequence of first opening and then closing said master control switch to restore said potential across the electrical load to a level sufficient to activate the equipment.

8. A voice operated unit as defined in claim 7 further including an enclosure, said first, second, and third named means being disposed within said enclosure to form a self-contained device adapted to be electrically interposed between the power supply and the controlled equipment.

References Cited by the Examiner

UNITED STATES PATENTS

| | | | |
|---|---|---|---|
| 1,734,732 | 11/1929 | Kranz | 192—129 |
| 1,872,372 | 8/1932 | Wensley | 340—148 |
| 2,004,893 | 6/1935 | Hall | 179—100.1 |
| 2,509,345 | 5/1950 | Howell et al. | 340—148 |
| 2,596,606 | 5/1952 | Scherer | 317—16 |
| 3,024,388 | 3/1962 | Blitchington | 317—16 |
| 3,198,884 | 8/1965 | Dersch | 179—1 |

OTHER REFERENCES

Kent abstract of application Serial Number 270,083; published June 30, 1953, O. G., vol. 671, p. 1501.

ORIS L. RADER, *Primary Examiner.*

LLOYD McCOLLUM, *Examiner.*

W. SHOOP, T. J. MADDEN, *Assistant Examiners.*